(12) United States Patent
Honda et al.

(10) Patent No.: US 8,593,460 B2
(45) Date of Patent: Nov. 26, 2013

(54) INFORMATION PROCESSING APPARATUS AND POWER SAVING EFFECT DISPLAY METHOD

(75) Inventors: Masami Honda, Ome (JP); Hideaki Andou, Ome (JP); Hideki Watanabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 667 days.

(21) Appl. No.: 12/507,739

(22) Filed: Jul. 22, 2009

(65) Prior Publication Data
US 2010/0156908 A1 Jun. 24, 2010

(30) Foreign Application Priority Data
Dec. 24, 2008 (JP) ................... 2008-327397

(51) Int. Cl.
*G06T 11/20* (2006.01)

(52) U.S. Cl.
USPC .......................... 345/440; 345/419

(58) Field of Classification Search
USPC ............. 345/619, 76, 168, 211, 212, 440; 703/18, 21; 370/311
See application file for complete search history.

(56) References Cited

U.S. PATENT DOCUMENTS

| | | | |
|---|---|---|---|
| 5,788,655 A | | 8/1998 | Yoshimura et al. |
| 5,989,200 A | | 11/1999 | Yoshimura et al. |
| 7,454,962 B2 | | 11/2008 | Nishiyama et al. |
| 7,787,405 B2 * | | 8/2010 | Dettinger et al. ............ 370/311 |
| 2005/0110717 A1 * | | 5/2005 | Iwamura .......................... 345/76 |
| 2006/0114267 A1 * | | 6/2006 | Park ............................... 345/619 |
| 2006/0238943 A1 * | | 10/2006 | Awakura et al. ............ 361/93.1 |
| 2007/0256481 A1 | | 11/2007 | Nishiyama et al. |
| 2011/0109613 A1 * | | 5/2011 | Asai et al. ..................... 345/211 |
| 2011/0125482 A1 * | | 5/2011 | Michelson .................... 345/168 |
| 2011/0145611 A1 * | | 6/2011 | Lee ............................... 713/320 |

FOREIGN PATENT DOCUMENTS

| | | |
|---|---|---|
| JP | H06-150156 | 5/1994 |
| JP | H08-126632 | 5/1996 |
| JP | H11-328152 | 11/1999 |
| JP | H11-328152 A | 11/1999 |
| JP | H11-354253 | 12/1999 |
| JP | H11-354253 A | 12/1999 |

(Continued)

OTHER PUBLICATIONS

Notification of Reason for Refusal mailed by the Japan Patent Office on Sep. 1, 2009 in corresponding Japanese patent app. No. 2008-327397 in 5 pages.

(Continued)

*Primary Examiner* — Chante Harrison
(74) *Attorney, Agent, or Firm* — Knobbe, Martens, Olson & Bear, LLP (57) ABSTRACT

According to an aspect of the present invention, there is provided an information processing apparatus that is operable in a first operation state and a second operation state, the apparatus including: a history storage unit configured to accumulate: a power usage reduction that is calculated based on a power usage difference between the first operation state and the second operation state; and an acquisition time at which the power usage reduction is acquired; an adding-up unit configured to add up values of the power usage reduction for a given period thereby calculating a power usage reduction amount; and an image generation unit configured to generate an image indicating a difference between the power usage reduction amount and a target value therefor and to display the image on a display device.

7 Claims, 6 Drawing Sheets

(56) References Cited

FOREIGN PATENT DOCUMENTS

| | | |
|---|---|---|
| JP | 2000-354337 | 12/2000 |
| JP | 2002-040065 | 2/2002 |
| JP | 2002-040065 A | 2/2002 |
| JP | 2002-117183 | 4/2002 |
| JP | 2002-312537 | 10/2002 |
| JP | 2003-134695 | 5/2003 |
| JP | 2005-339187 | 12/2005 |
| JP | 2006-057484 | 3/2006 |
| JP | 2006-292279 | 10/2006 |
| JP | 2006-349483 | 12/2006 |
| JP | 2007048219 A * | 2/2007 |
| JP | 2008-178282 | 7/2008 |

OTHER PUBLICATIONS

Decision of Refusal mailed by the Japan Patent Office on Dec. 1, 2009 in corresponding Japanese patent app. No. 2008-327397 in 8 pages.

Pretrial Reexamination Report mailed by the Japan Patent Office on May 11, 2010 in corresponding Japanese patent app. No. 2008-327397 in 6 pages.

* cited by examiner

| DATE AND TIME | PRESENT POWER USAGE | POWER USAGE REDUCTION* | POWER USAGE REDUCTION AMOUNT |
|---|---|---|---|
| MM DD, 16 HR. 12 MIN. 20 SEC. | 50W | 25W | |
| MM DD, 16 HR. 12 MIN. 40 SEC. | 48W | 27W | 500.0Ws |
| MM DD, 16 HR. 13 MIN. 00 SEC. | 52W | 23W | 486.6Ws |
| MM DD, 16 HR. 13 MIN. 20 SEC. | 52W | 23W | 460.0Ws |
| MM DD, 16 HR. 13 MIN. 40 SEC. | 52W | 23W | |
| ..... | ..... | ..... | ..... |

* WHEN MAXIMUM POWER USAGE IS 75 W

INFORMATION PROCESSING APPARATUS AND POWER SAVING EFFECT DISPLAY METHOD

CROSS-REFERENCE TO RELATED APPLICATIONS

This application is based upon and claims the benefit of priority from Japanese Patent Application No. 2008-327397, filed on Dec. 24, 2008, the entire contents of which are incorporated herein by reference.

BACKGROUND

1. Field

An aspect of the present invention relates to an information processing apparatus capable of displaying a reduction in power usage as well as to a power saving effect display method.

2. Description of the Related Art

JP-H11-354253-A discloses a technique to display a reduction in power usage for the user.

The device of JP-H11-354253-A for displaying the saving amount of power usage in an electric apparatus is configured so as to allow the user to choose between high-power mode and low-power mode. If the user chooses low-power mode, the saving amount of power usage with respect to a power usage of high-power mode can be calculated for a using time and displayed on a display unit in the form of a numerical value, a symbol, or a figure.

Incidentally, recent information processing apparatus such as notebook personal computers are provided with a so-called power saving function for reducing the power usage. In many notebook personal computers, various settings can be made; for example, any of various operation modes can be set to suit for battery driving and to suit for AC adaptor driving, and the power to a display unit or a hard disk drive can be shut off during non-use periods that are set for each operation mode. The power saving function of this kind information processing apparatus allows the user to use the information processing apparatus in various power usage states according to his or her using style.

However, in conventional techniques, no consideration is given to complex power usage settings provided in recent information processing apparatus. Furthermore, conventional techniques merely display the saving amount in power usage in an inhuman way and hence has difficulty enhancing the user's eagerness to attain power saving. Still further, in conventional techniques, no consideration is given to a target value of power usage, which makes it difficult for the user of an information processing apparatus and his or her manager to manage power saving activities sufficiently.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided an information processing apparatus that is operable in a first operation state and a second operation state, the apparatus including: a history storage unit configured to accumulate: a power usage reduction that is calculated based on a power usage difference between the first operation state and the second operation state; and an acquisition time at which the power usage reduction is acquired; an adding-up unit configured to add up values of the power usage reduction for a given period thereby calculating a power usage reduction amount; and an image generation unit configured to generate an image indicating a difference between the power usage reduction amount and a target value therefor and to display the image on a display device.

Embodiments of the information processing apparatus and the power saving effect display method according to the invention will be hereinafter described with reference to the accompanying drawings.

Figure 1:
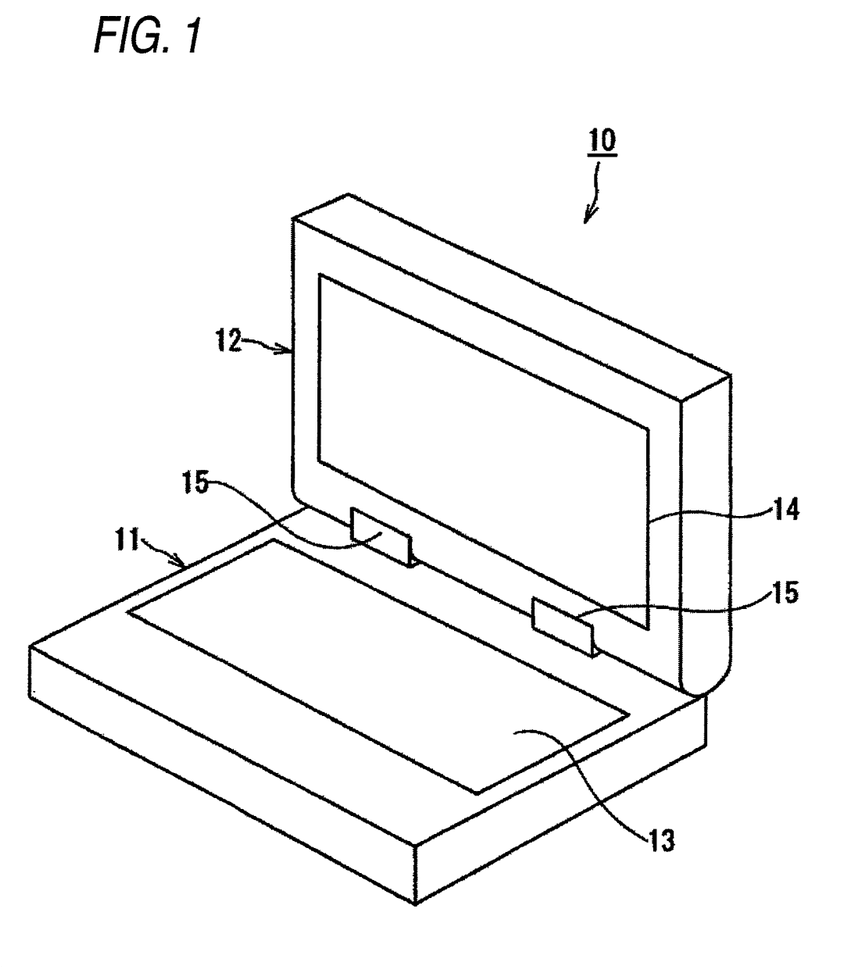
FIG. 1 exemplarily shows an information processing apparatus according to a first embodiment of the present invention.

FIG. 1 illustrates an information processing apparatus according to a first embodiment of the invention. The invention can be applied to various information processing apparatus which consume electric power and have a display device. This embodiment is directed to a notebook personal computer (hereinafter abbreviated as a personal computer) as an example of the information processing apparatus according to the invention.

As shown in FIG. 1, the personal computer 10 is equipped with a computer main body 11 and a display unit 12.

The computer main body 11 has a thin, box-shaped body, and a keyboard as an input unit 13 is provided on a central portion of the top surface of the computer main body 11. A user-side portion of the top surface of the computer main body 11 is provided with a palm rest.

The display unit 12 has a display device 14 such as an LCD (liquid crystal display) and is connected to the computer main body 11 by connection members (hinges) 15 which support the display unit 12 in an openable/closable manner.

Figure 2:
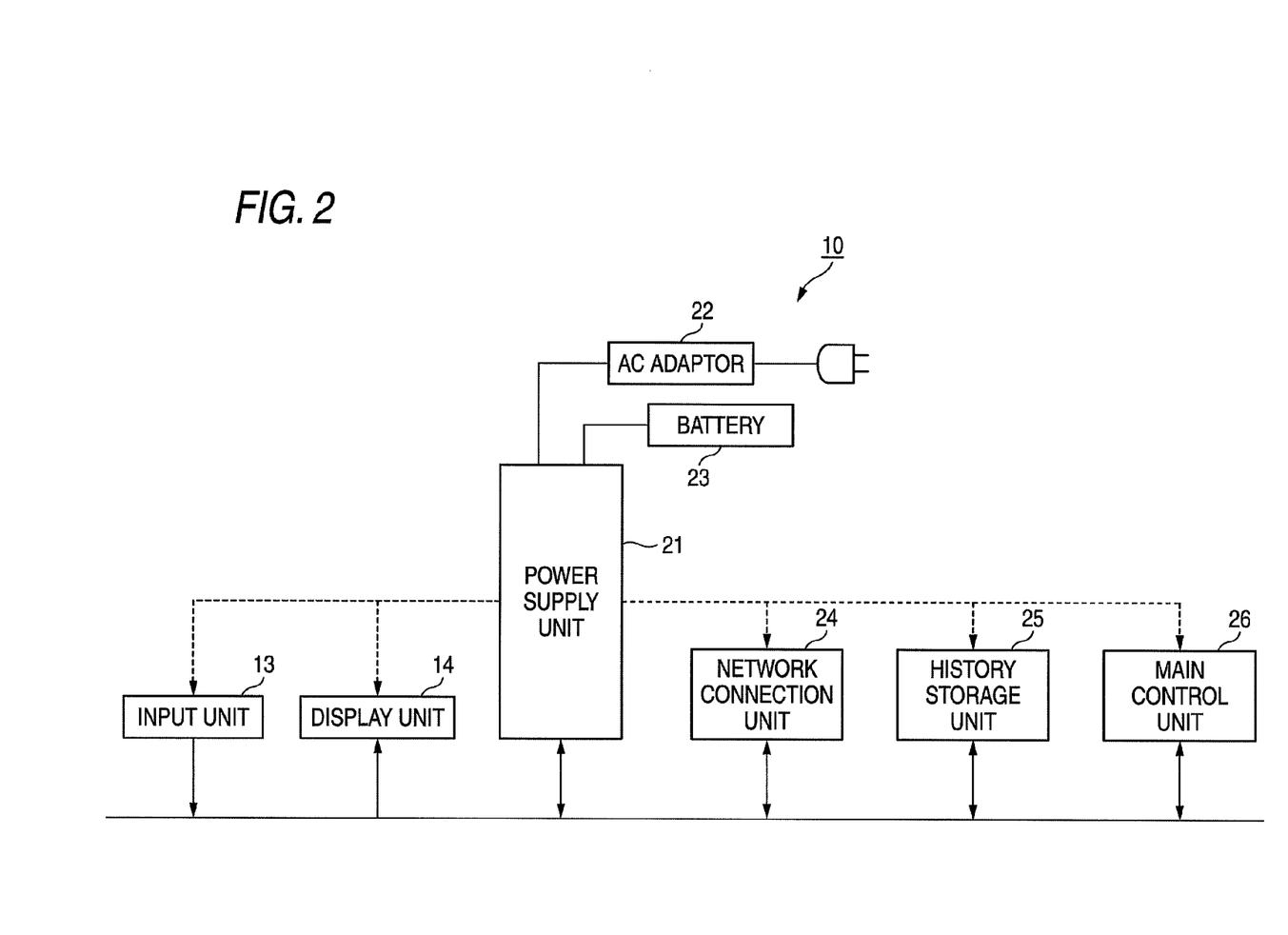
FIG. 2 is a schematic block diagram exemplarily showing an internal configuration of the information processing apparatus according to the first embodiment.

FIG. 2 is a schematic block diagram illustrating an internal configuration of the personal computer 10.

As shown in FIG. 2, the personal computer 10 is equipped with the input unit 13, the display device 14, a power supply unit 21, an AC adaptor 22, a battery 23, a network connection unit 24, a history storage unit 25, and a main control unit 26.

Where the power supply unit 21 is supplied with external power (e.g., commercial power) via the AC adaptor 22, the power supply unit 21 generates system power to be supplied to the individual components (computer main body 11 and display unit 12) of the personal computer 10 using the external power supplied via the AC adaptor 22. Where the power supply unit 21 is supplied with no external power via the AC adaptor 22, the power supply unit 21 generates system power to be supplied to the individual components of the personal computer 10 using the battery 23.

The main control unit 26 can acquire information indicating present power usage of the personal computer 10 at a prescribed cycle (e.g., 20 sec) or at prescribed time points.

The network connection unit 24 incorporates various information communication protocols corresponding to respective network forms. The network connection unit 24 connects the personal computer 10 to other electric apparatus in accordance with the various protocols. For example, there can be used electric connection via an electronic network, such as wireless/wired LANs (local area networks), the Internet, telephone communication networks, optical fiber communication networks, cable communication networks, and satellite communication networks, which uses electric communication technologies.

Figure 3:
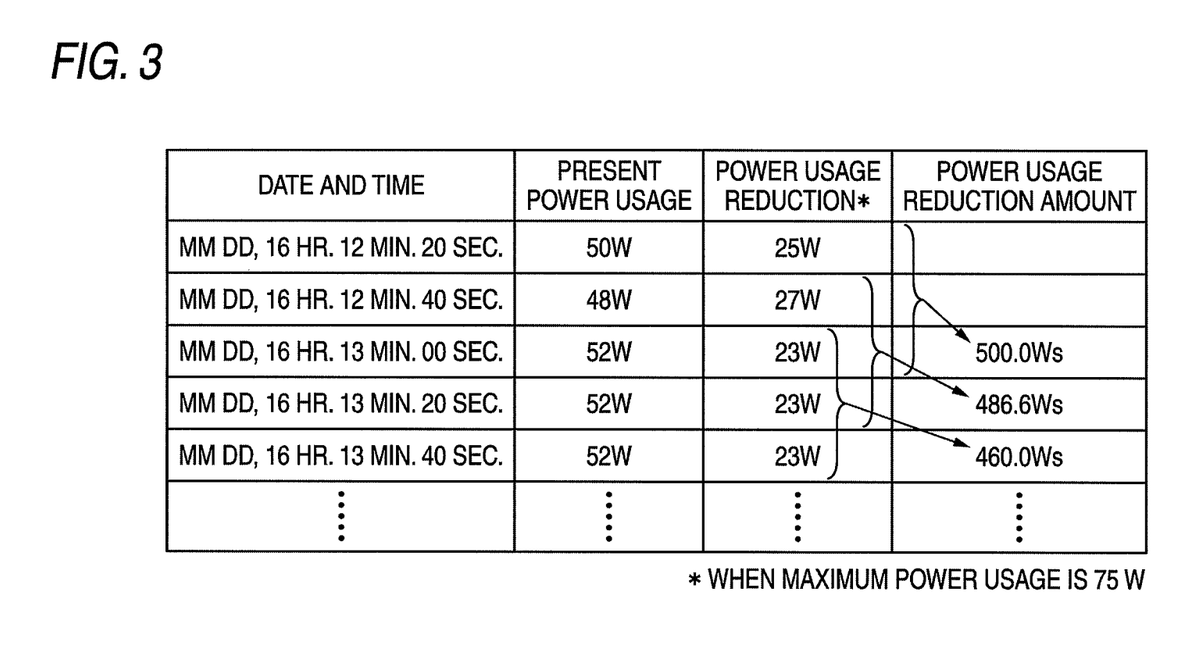
FIG. 3 exemplarily illustrates information stored in a history storage unit.

FIG. 3 illustrates example information stored in the history storage unit 25.

Controlled by the main control unit 26, the history storage unit 25 sequentially stores pieces of information in each of which power usage in a second operation state, a power reduction that is calculated based on the difference between power usages in first and second operation states, and an acquisition time of the power usage information are correlated with each other.

In the embodiment, the power usage in the first operation state is maximum power usage in an operation state that requires maximum power, the power usage in the second operation state is present power usage (i.e., actual power usage in an operation state of a present power saving mode setting), and the acquisition time of the power usage information is a present time (date and time). That is, as shown in FIG. 3, controlled by the main control unit 26, the history storage unit 25 sequentially stores pieces of information in each of which the present power usage, a power reduction that is calculated based on the difference between the maximum power usage and the present power usage, and a present time are correlated with each other. As a result, a power usage history is stored in the history storage unit 25.

It is appropriate for the history storage unit 25 to also store a power usage reduction calculated by the main control unit 26 in such a manner that it is correlated with a present date and time as shown in FIG. 3. For example, the power usage reduction can be calculated on the basis of the average of a present power reduction and immediately preceding one or plural power reductions and their pieces of time/date information. The following description will be made of a case that the main control unit 26 acquires present power usage information every 20 seconds and a power usage reduction from an immediately preceding time and a present time is calculated on the basis of a present power reduction and two immediately preceding power reductions (three power reductions in total) and stored in the history storage unit 25.

A power usage reduction in a suspension state also can be stored into the history storage unit 25. For example, when transitioned to the suspension state, information indicating that a transition to the suspension state occurs and time information thereof are stored into a nonvolatile storage unit such as the history storage unit 25, and when returned from the suspension state, a power usage reduction during the suspension state is calculated based on the stored pieces of information.

The operation state that requires maximum power means a state that the power usage mode is set to a so-called full-power mode. In the full-power mode, the personal computer 10 consumes maximum power, that is, the luminance of the display device 14 is set at a maximum value in a settable range, a CPU exercises its maximum processing ability, and power supply to the display device 14 and a hard disk drive is continued even if the user is not using the personal computer 10.

The main control unit 26, which is composed of the CPU, a RAM, and a storage medium as typified by a ROM, and other components, controls processing operations of the personal computer 10 according to programs stored in these storage media.

The CPU loads a power saving effect display program and data necessary for execution of this program into the RAM from the storage medium such as the ROM. According to this program, the CPU displays the difference between a target value and a result value of power usage reduction to the display device 14 by use of an image that would induce a sense of accomplishment of the user visually and thereby arouse the imaginativeness of the user, and performs processing that makes it possible to easily compare the target value and the result value.

Further, the CPU loads the power saving program and the data necessary for execution of this program into the RAM from the storage medium such as the ROM. And, the CPU controls operation of the personal computer 10 according to the power saving program.

The power saving program is an application program for allowing the user to set the power usage state (power usage mode) of the information processing apparatus according to his or her using style. The user previously makes settings relating to power to be supplied to the individual components of the personal computer 10 through the input unit 13. For example, one power usage mode is selected from the full-power mode and plural power saving modes suitable for battery 23 driving. And, prescribed non-use period in which the power to the display device 14 is turned off and the power to the hard disk drive is turned off may be set in each power saving mode. The user can easily change the power usage mode of the personal computer 10 using the power saving program.

The RAM of the main control unit 26 provides a work area for temporarily storing a program to be executed by the CPU and related data.

The storage medium such as the ROM of the main control unit 26 stores boot-up programs of the personal computer 10, the power saving program, and various data that are necessary for executing these programs.

As the storage medium, a CPU-readable recording medium such as a magnetic recording medium, an optical recording medium, or a semiconductor memory can be used. All or part of the programs and data can be downloaded through an electronic network.

Figure 4:
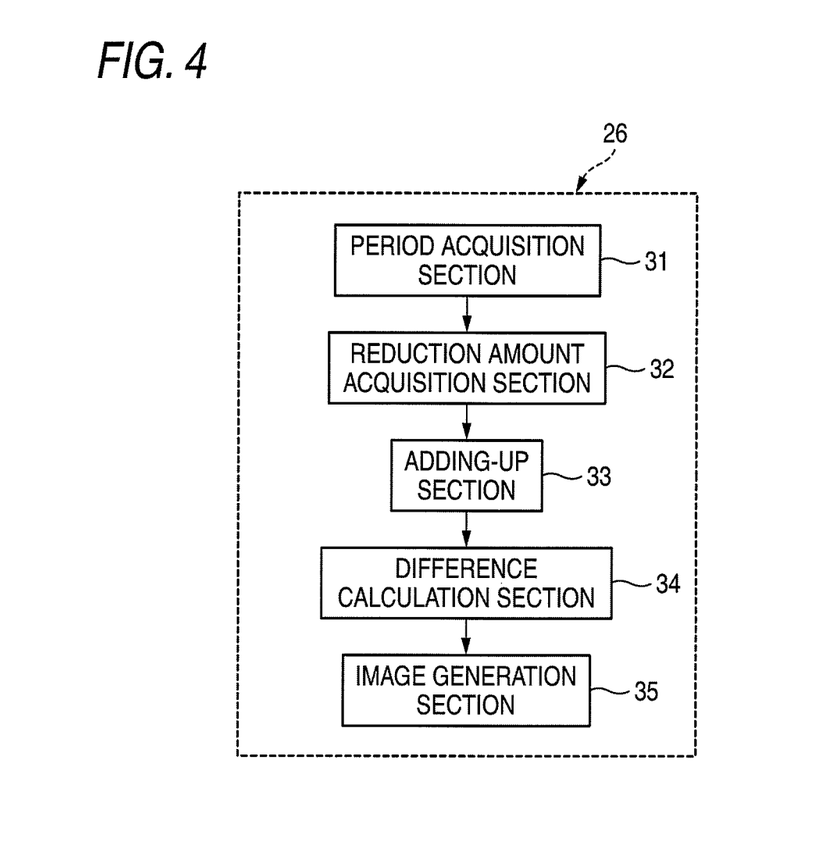
FIG. 4 is a schematic block diagram exemplarily showing function implementing sections of a CPU of a main control unit.

FIG. 4 illustrates function implementing sections of the CPU of the main control unit 26. Each of the function implementing sections may be a hardware logic such as a circuit without using the CPU.

As shown in FIG. 4, the CPU of the main control unit 26 functions as a period acquisition section 31, a reduction amount acquisition section 32, an adding-up section 33, a difference calculation section 34, and an image generation section 35 according to the power saving effect display program. The sections 31-35 use prescribed work areas of the RAM as temporary data storage locations.

The period acquisition section 31 acquires a period for calculation of a power reduction. This period may be specified by the user through the input unit 13 or predetermined. A power usage history is stored in the history storage unit 25. Therefore, the period for calculating a power reduction may be either a period that includes the present time such as latest one month or a period that does not includes the present time such as one year from three years before to two years before.

The reduction amount acquisition section 32 acquires pieces of power usage reduction information belonging to the period acquired by the period acquisition section 31 on the basis of the information (see FIG. 3) stored in the history storage unit 25.

The adding-up section 33 adds up the power usage reductions in the period acquired by the period acquisition section 31.

The difference calculation section 34 calculates the difference between a power usage reduction target value previously stored in the storage medium of the main control unit 26, the history storage unit 25, or the like and a power usage reduction addition value (hereinafter referred to as a result value) received from the adding-up section 33 and gives the difference to the image generation section 35.

The difference calculation section 34 may calculate the difference between a target value and a result value of carbon dioxide emission from the difference between a target value and a result value of power usage reduction and give it to the image generation section 35. A carbon dioxide emission amount can be calculated based on electric power and per-unit carbon dioxide emission amounts of respective power sources. The difference calculation section 34 may calculate a difference in an electricity charge from the difference between a target value and a result value of power usage reduction and give it to the image generation section 35. An electricity charge can be calculated on the basis of electric power and an electricity price per unit electric power.

Figure 5:
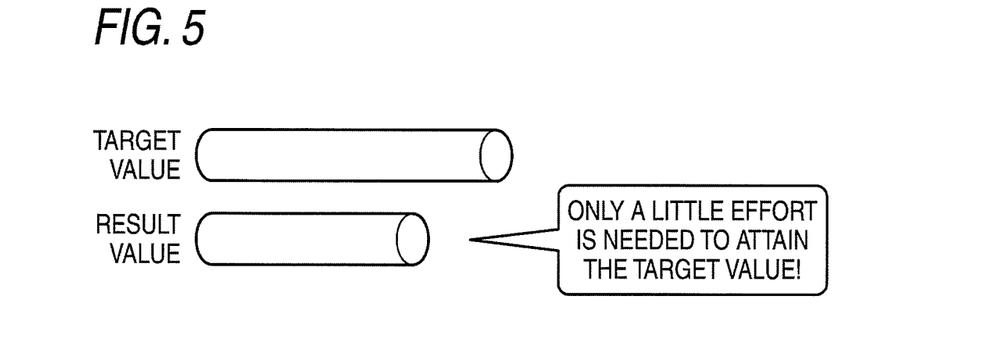
FIG. 5 illustrates an example image to show the difference between a target value and a result value of power usage reduction.
Figure 6:
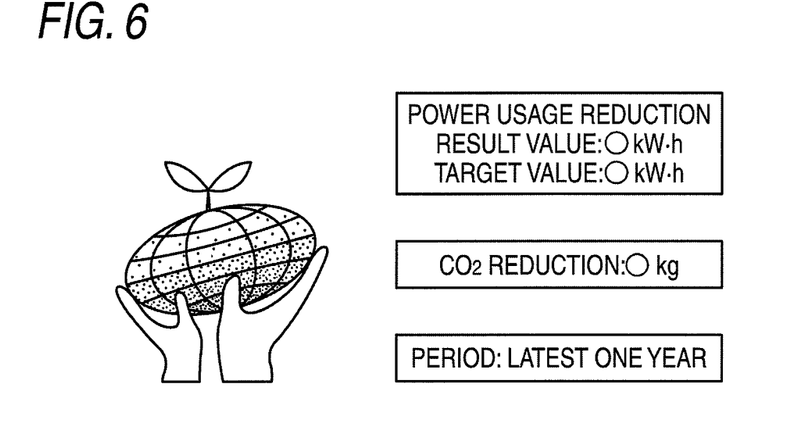
FIG. 6 illustrates another example image showing the difference between a target value and a result value of power usage reduction.

FIGS. 5 and 6 illustrate example images showing the difference between a target value and a result value of power usage reduction.

The image generation section 35 generates an image showing the difference between a target value and a result value of power usage reduction and displays it on the display device 14. This image is generated so as to visually induce a sense of accomplishment of the user more as the result value comes closer to the target value and thereby arouse the imaginativeness of the user.

As such image, a bar graph shown in FIG. 5, which allows the user to recognize the difference between a target value and a result value of power usage reduction visually and clearly, may be used. When looking at this bar graph, the user could really feel to what extent he or she has contributed to the reduction of loads on the environment. Furthermore, text information or the like suitable for the difference between a target value and a result value of power usage reduction may be displayed to arouse the imaginativeness of the user. The difference between a target value and a result value of power usage reduction may be displayed separately for AC adaptor 22 driving and battery 23 driving. In this case, the main control unit 26 causes the history storage unit 25 to also store information indicating AC adaptor 22 driving or battery 23 driving in such a manner that it is correlated with each corresponding piece of information.

For example, as the image that would induce a sense of accomplishment of the user visually, there may be used an image shown in FIG. 6 having a figure that is partially painted over with colors that depend on the difference between a target value and a result value of power usage reduction. A sense of accomplishment of the user could be visually induced more by drawing the figure in the image of the earth and by varying the color painted over the figure gradually from red to green as the result value comes closer to the target value. The image generation section 35 may display, on the display device 14, an image that celebrates accomplishment of the target value when the result value has reached the target value.

Since a target value and a result value of power usage reduction are displayed by using an image that would visually induce a sense of accomplishment of the user more as the result value comes closer to the target value (see FIGS. 5 and 6), the user can really feel intuitively and enjoy a contribution of the use history of his or her own personal computer 10 to the reduction of loads on the environment and can easily compare the target value and the result value of power usage reduction and recognize the difference between them.

Next, an example operation of the information processing apparatus according to the embodiment will be described.

Figure 7:
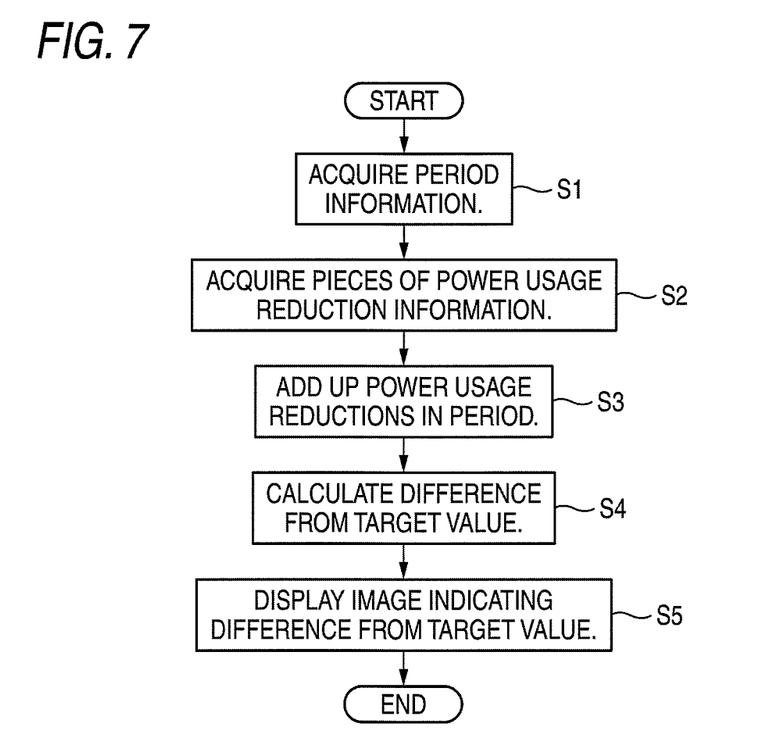
FIG. 7 is an exemplary flowchart of a procedure for displaying the difference between a target value and a result value of power usage reduction by use of an image that would arouse the imaginativeness of the user to allow the user to compare the target value and the result value easily.

FIG. 7 is a flowchart of a procedure according to which the main control unit 26 displays, on the display device 14, the difference between a target value and a result value of power usage reduction using an image that would induce a sense of accomplishment of the user visually and thereby arouse the imaginativeness of the user to allow the user to compare the target value and the result value easily. In FIG. 7, symbols each consisting of "S" and a number following it denote individual steps of the flowchart.

This procedure is started when a target value of power usage reduction has been set and stored in the storage medium of the main control unit 26 or the history storage unit 25.

At step S1, the period acquisition section 31 acquires a period for calculation of a power usage reduction and stores it in a prescribed work area of the RAM. This period may be either a period that is specified by the user through the input unit 13 or a predetermined period.

At step S2, the reduction amount acquisition section 32 acquires pieces of power usage reduction information belonging to the period stored in the prescribed work area of the RAM on the basis of information (see FIG. 3) stored in the history storage unit 25.

At step S3, the adding-up section 33 adds up power usage reductions in the period that is stored in the prescribed work area of the RAM.

At step S4, the difference calculation section 34 calculates the difference between the power usage reduction target value previously stored in the storage medium of the main control unit 26 or the history storage unit 25 and a power usage reduction addition value received from the adding-up section 33.

At step S5, the image generation section 35 generates an image corresponding to the difference between the target value and the result value and displays it on the display device 14. This image is generated to visually induce a sense of accomplishment of the user more as the result value comes closer to the target value (see FIGS. 5 and 6).

According to the above-described procedure, the difference between a target value and a result value of power usage reduction can be displayed on the display device 14 using an image that would induce a sense of accomplishment of the user visually and thereby arouse the imaginativeness of the user and to thereby allow the user to compare the target value and the result value easily.

The personal computer 10 according to the embodiment can display, on the display device 14, the difference between a target value and a result value of power usage reduction using an image that would induce a sense of accomplishment of the user visually and thereby arouse the imaginativeness of the user. As a result, the user can really feel intuitively and enjoy a contribution of the use history of his or her own personal computer 10 to the reduction of loads on the environment. As such, the personal computer 10 according to the embodiment can convince the user to tolerate a little inconvenience caused by power saving activities in exchange for this enjoyment and support the user so that his or her eagerness to attain power saving is enhanced.

The personal computer 10 according to the embodiment allows the user to recognize the difference between a target value and a result value of power usage reduction by comparing them easily. As such, the personal computer 10 according to the embodiment can support the user of the personal computer 10 and his or her manager so that they can manage power saving activities easily.

Next, an information processing apparatus according to a second embodiment of the invention will be described.

Figure 8:
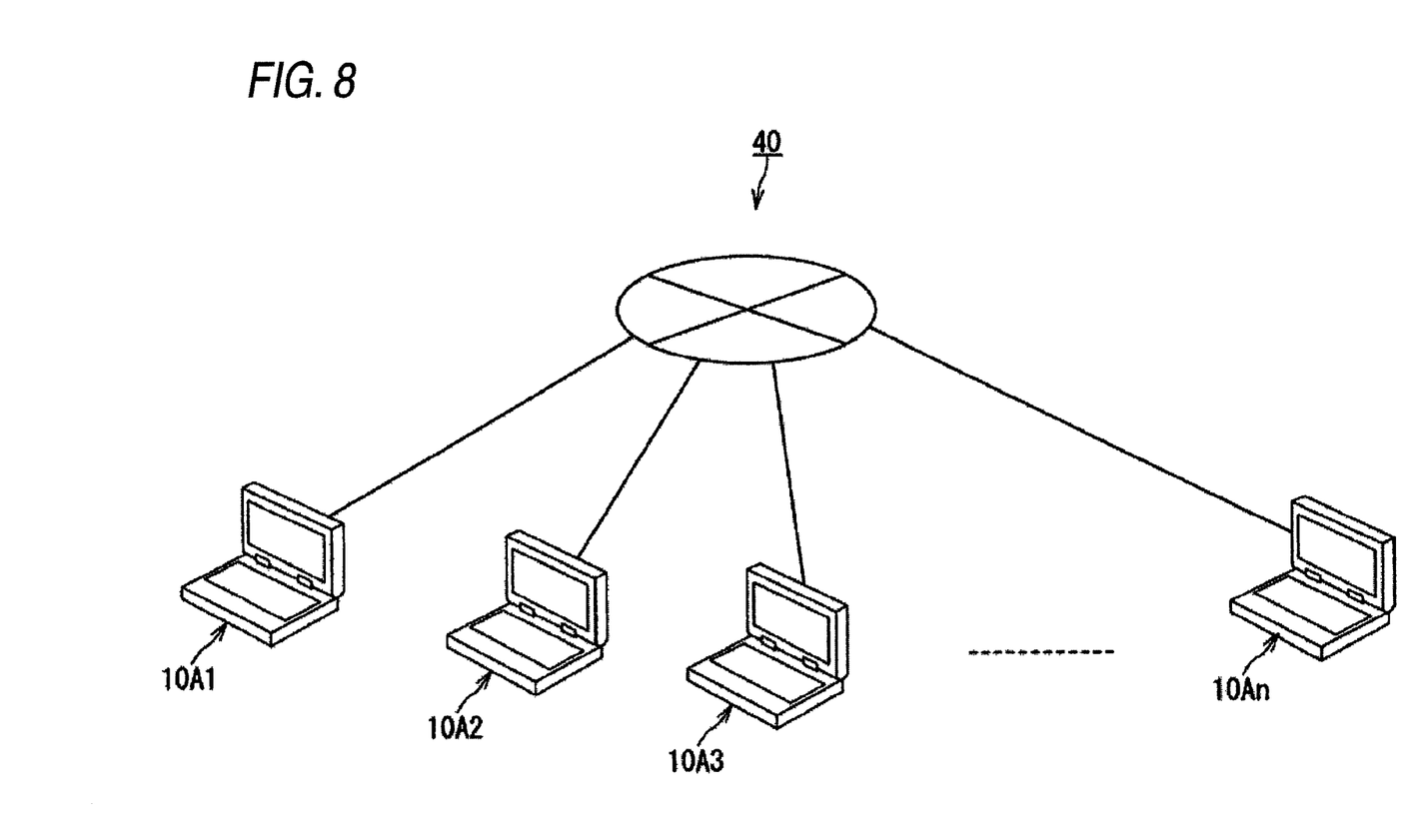
FIG. 8 exemplarily shows an information processing apparatus according to a second embodiment of the invention.

FIG. 8 illustrates an information processing apparatus according to the second embodiment.

A personal computer 10A1 according to the second embodiment is different from the personal computer 10 according to the first embodiment in that n personal computers 10A1-10An (n: an arbitrary natural number) are connected to each other so as to be able to exchange data, and at least the personal computer 10A1 holds information of the history storage units 25 of the personal computers 10A2-10An. The other parts of the configuration and the workings of the personal computer 10A1 are substantially the same as those of the personal computer 10 of FIG. 1, and hence the same units, sections, etc. as in the personal computer 10 will be given the same symbols as used in the personal computer 10 and will not be described in detail.

The history storage unit 25 of the personal computer 10A1 not only stores power usage information (see FIG. 3) of the personal computer 10A1 but also receives and stores stored information of the history storage unit 25 of each of the other personal computers 10A2-10An. The adding-up portion 33 of the personal computer 10A1 can calculate a power usage reduction of the entire information processing apparatus group 40 in a period acquired by the period acquisition section 31. The image generation section 35 of the personal computer 10A1 can generate an image indicating the difference between a result value and a target value of power usage reduction of the entire information processing apparatus group 40 and display it on the display device 14.

The personal computer 10A1 according to the second embodiment provides the same advantages as the personal computer 10 according to the first embodiment and provides a support for managing power saving activities in a more systematic manner than the personal computer 10 according to the first embodiment.

The invention is not limited to the above embodiments themselves and, in the practice stage, may be embodied in such a manner that constituent elements are modified without departing from the spirit and scope of the invention. And various inventions can be conceived by properly combining plural constituent elements disclosed in each embodiment. For example, several ones of the constituent elements of each embodiment may be omitted. Furthermore, constituent elements of different embodiments may be combined as appropriate.

The invention can be applied to not only notebook personal computers (the case of the embodiments) but also various information processing apparatus which consume electric power and have a display device.

Although in each embodiment the steps of the process are executed in time-series order as shown in the flowchart, the invention is not limited to such a case. The process may include steps that are executed parallel or individually.

According to an aspect of the invention, there is provided an information processing apparatus and a power saving effect display method capable of enhancing the user's eagerness to attain power saving by displaying the difference between a target value and a result value of power usage reduction using an image that would arouse the imaginativeness of the user, and supporting the user of the information processing apparatus and his or her manager so that they can manage power saving activities easily by allowing them to compare a target value and a result value easily.

What is claimed is:

1. An information processing apparatus comprising:
    a power supply module configured to generate a system power to be supplied to the information processing apparatus in either of a first mode and a second mode, the power supply module generating the system power from an externally-supplied utility power in the first mode, the power supply module generating the system power from a power received from a built-in battery in the second mode;
    a history storage module configured to cumulatively store:
    an imaginary-saved power calculated based on a difference between a reference power usage and a current power usage;
    a power generation mode of the power supply module in correlation with the imaginary-saved power, the power generation mode being the first mode or the second mode; and
    a date and time at which the imaginary-saved power and the power generation mode are obtained;
    the history storage module further storing a first target power savings amount set for the first mode and a second target power savings amount set for the second mode;
    a sum module configured to calculate:
        a first power savings amount by adding values of the imaginary-saved power correlated with the first mode within a given period; and
        a second power savings amount by adding values of the imaginary-saved power correlated with the second mode within the given period; and
    a subtraction module configured to calculate:
        a first remaining power savings amount by subtracting the first power savings amount from the first target power savings amount; and
        a second remaining power savings amount by subtracting the second power savings amount from the second target power savings amount;
    an image generator configured to generate an image indicating a degree of power saving attainment for each of the first mode and the second mode on a display device based on the first and second remaining power savings amounts.

2. The apparatus of claim 1,
    wherein the image comprises a figure comprising a color gradually varying from red to green as each of the first and second remaining power savings amounts comes closer to zero.

3. The apparatus of claim 1,
    wherein the image comprises at least one of:
        numerical information of the first and second power savings amounts;

numerical information of a carbon dioxide reduction amount calculated based on the first and second power savings amounts and a per-unit carbon dioxide emission amount of respective power sources; and numerical information of an electricity charge reduction calculated based on the first and second power savings amounts.

4. An apparatus group comprising:

a plurality of information processing apparatuses, each information processing apparatus comprising:
- a power supply module configured to generate a system power to be supplied to the information processing apparatus in either of a first mode and a second mode, the power supply module generating the system power from an externally-supplied utility power in the first mode, the power supply module generating the system power from a power received from a built-in battery in the second mode;
- a history storage module configured to cumulatively store:
  - an imaginary-saved power calculated based on a difference between a reference power usage and a current power usage;
  - a power generation mode of the power supply module in correlation with the imaginary-saved power, the power generation mode being the first mode or the second mode; and
  - a date and time at which the imaginary-saved power and the power generation mode are obtained;
- the history storage module further storing a first target power savings amount set for the first mode and a second target power savings amount set for the second mode;

at least one of the information processing apparatuses further comprises:
- a group history storage module configured to store the imaginary-saved powers in all of the information processing apparatuses and the date and times thereof;
- a group sum module configured to calculate:
  - a first power savings amount by adding values of the imaginary-saved powers in all of the information processing apparatuses correlated with the first mode within a given period; and
  - a second power savings amount by adding values of the imaginary-saved powers in all of the information processing apparatuses correlated with the second mode within the given period;
  - a first group target power savings amount by adding values of the first target power savings amount in all of the information processing apparatuses within the given period;
  - a second group target power savings amount by adding values of the second target power savings amount in all of the information processing apparatuses within the given period; and
- a subtraction module configured to calculate:
  - a first remaining power savings amount by subtracting the first power savings amount from the first group target power savings amount; and
  - a second remaining power savings amount by subtracting the second power savings amount from the second group target power savings amount;
- a group image generator configured to generate an image indicating a degree of power saving attainment for each of the first mode and the second mode on a display device based on the first and second remaining power savings amounts.

5. A power saving effect display method comprising:

generating a system power to be supplied to a plurality of information processing apparatuses in either of a first mode and a second mode, wherein in the first mode the system power is generated from an externally-supplied utility power, wherein in the second mode the system power is generated from a power received from a built-in battery;

calculating imaginary-saved powers based on a difference between a reference power usage and a current power usage of the plurality of information processing apparatuses;

storing the calculated imaginary-saved powers, power generation modes in correlation with the imaginary-saved powers, the power generation modes being the first mode or the second mode, and a date and time at which the imaginary-saved powers and the power generation modes are obtained into a history storage module;

further storing a first target power savings amount set for the first mode and a second target power savings amount set for the second mode;

calculating a first power savings amount by adding values of the imaginary-saved powers in all of the information processing apparatuses correlated with the first mode within a given period;

calculating a second power savings amount by adding values of the imaginary-saved powers in all of the information processing apparatuses correlated with the second mode within the given period;

calculating a first group target power savings amount by adding values of the first target power savings amount in all of the information processing apparatuses within the given period;

calculating a second group target power savings amount by adding values of the second target power savings amount in all of the information processing apparatuses within the given period;

calculating a first remaining power savings amount by subtracting the first power savings amount from the first group target power savings amount;

calculating a second remaining power savings amount by subtracting the second power savings amount from the second group target power savings amount; and displaying an image on a display device indicating a degree of power savings attainment for each of the first mode and the second mode on based on the first and second remaining power savings amounts.

6. The apparatus of claim 1, wherein the given period comprises at least one of:

a month up to a current time point;

a year up to the current time point; and an arbitrary term starting from a given starting time point to a given end time point except for the current time point.

7. The apparatus of claim 1, wherein the information processing apparatus and another information processing apparatus having substantially similar functionality are connected to form a group, wherein the history storage module is further configured to cumulatively store:
- a group imaginary-saved power calculated based on a difference between a group reference power usage and a group current power usage; and
- a date and time at which the group imaginary-saved power is obtained the history storage module further storing a group target power savings amount;

wherein the sum module is further configured to calculate:

a group power savings amount by adding values of the group imaginary-saved power the given period;

wherein the subtraction module is further configured to calculate:

a group remaining power savings amount by subtracting the group power savings amount from the group target power savings amount;

wherein the image generator is further configured to generate another image indicating a degree of power saving attainment for the group, based on the group remaining power savings amount.

\* \* \* \* \*